(12) United States Patent
Harris et al.

(10) Patent No.: US 8,603,688 B2
(45) Date of Patent: Dec. 10, 2013

(54) ANODE GAS COMPOSITION UTILIZING H2 INJECTION PRESSURE WAVE PROPAGATION RATES

(75) Inventors: Daniel I. Harris, Honeoye Falls, NY (US); Matthew A. Lang, Churchville, NY (US); Daniel C. Di Fiore, Scottsburg, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 547 days.

(21) Appl. No.: 12/913,324

(22) Filed: Oct. 27, 2010

(65) Prior Publication Data
US 2012/0107705 A1    May 3, 2012

(51) Int. Cl.
*H01M 8/04*    (2006.01)
(52) U.S. Cl.
USPC .............................. 429/428; 429/415; 429/443
(58) Field of Classification Search
None
See application file for complete search history.

(56) References Cited

U.S. PATENT DOCUMENTS

| | | | |
|---|---|---|---|
| 7,169,490 B2 | 1/2007 | Barton et al. | |
| 2006/0024548 A1* | 2/2006 | Pechtold et al. | 429/34 |
| 2009/0208789 A1* | 8/2009 | Janarthanam et al. | 429/21 |

FOREIGN PATENT DOCUMENTS

JP    2003-077518    *    3/2003

* cited by examiner

*Primary Examiner* — Jonathan Crepeau
(74) *Attorney, Agent, or Firm* — John A. Miller; Miller IP Group, PLC

(57) ABSTRACT

A system for determining the concentration of hydrogen in an anode sub-system of a fuel cell system. The fuel cell system includes at least one fuel cell, an anode inlet, an anode outlet, an anode recirculation line, a source of hydrogen gas and an injector for injecting the hydrogen gas. First and second acoustic sensors are provided in the anode recirculation line and are spaced a known distance from each other. A controller that is responsive to the output signals from the first and second acoustic sensors determines the concentration of hydrogen gas in the anode recirculation line based on the time between when the controller receives the sensor signal from the first sensor and receives the sensor signal from the second sensor.

20 Claims, 3 Drawing Sheets

ANODE GAS COMPOSITION UTILIZING H2 INJECTION PRESSURE WAVE PROPAGATION RATES

BACKGROUND OF THE INVENTION

1. Field of the Invention

This invention relates generally to a system and method for detecting and identifying the composition of gases flowing in an anode sub-system of a fuel cell system and, more particularly, to a system and method for detecting and identifying the composition of gases flowing in an anode sub-system of a fuel cell system using an acoustic delay between two or more locations in the anode sub-system.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

A fuel cell stack typically includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

The MEAs are permeable and thus allow nitrogen in the air from the cathode side of the stack to permeate therethrough and collect in the anode side of the stack, referred to in the industry as nitrogen cross-over. Even though the anode side pressure may be slightly higher than the cathode side pressure, cathode side partial pressures will cause oxygen and nitrogen to permeate through the membrane. The permeated oxygen combusts in the presence of the anode catalyst, but the permeated nitrogen in the anode side of the fuel cell stack dilutes the hydrogen. If the nitrogen concentration increases above a certain percentage, such as 50%, the fuel cell stack becomes unstable and may fail.

It is known in the art to provide a bleed valve at the anode exhaust gas output of the fuel cell stack to remove nitrogen from the anode side of the stack. It is also known in the art to estimate the molar fraction of nitrogen in the anode side using a model to determine when to perform the bleed of the anode side or anode sub-system. However, the model estimation may contain errors, particularly as degradation of the components of the fuel cell system occurs over time. If the anode nitrogen molar fraction estimation is significantly higher than the actual nitrogen molar fraction, the fuel cell system will vent more anode gas than is necessary, i.e., will waste fuel. If the anode nitrogen molar fraction estimation is significantly lower than the actual nitrogen molar fraction, the system will not vent enough anode gas and may starve the fuel cells of reactants, which may damage the electrodes in the fuel cell stack.

As discussed above, the performance of the fuel cell system is influenced by the composition of gases entering the stack on the anode and cathode. During normal operation of the fuel cells, nitrogen from the cathode side permeates through the membrane to the anode side, which dilutes the fuel concentration. If there is too much nitrogen or water in the anode side, cell voltages may decrease. While laboratory sensors may be used to measure actual fuel concentration levels, it is not practical to use these sensors to measure the concentration of hydrogen in the anode sub-system. Lab grade thermal conductivity sensors may be used, however, they are large and expensive, and can be damaged by liquid water, which may be present in the anode sub-system. Diffusion based models with reset capability may also be used. However, this approach periodically purges enough anode gas to ensure there is no nitrogen present in the anode sub-system, which may cause hydrogen fuel to be wasted. Acoustic methods employing transceivers is another approach, however, this requires an acoustic signal strong enough to negate the effects of attenuation over the distance between the transceiver and the receiver. Therefore, there is a need in the art to detect and identify the composition of gases in the anode sub-system of a fuel cell system to control the fuel concentration in the anode sub-system.

SUMMARY OF THE INVENTION

The present invention discloses a system for determining the concentration of hydrogen in an anode sub-system of a fuel cell system is disclosed. The fuel cell system includes at least one fuel cell, an anode inlet, an anode outlet, an anode recirculation line, a source of hydrogen gas and an injector for injecting the hydrogen gas. First and second acoustic sensors are provided in the anode recirculation line and are spaced a known distance from each other. A controller responsive to the output signals from the first and second acoustic sensors determines the concentration of hydrogen gas in the anode recirculation line based on the time between when the controller receives the sensor signal from the first sensor and receives the sensor signal from the second sensor.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for determining the concentration of gases in an anode sub-system of a fuel cell system is merely exemplary in nature, and is in no way intended to limit the invention or its applications or uses.

Figure 1:
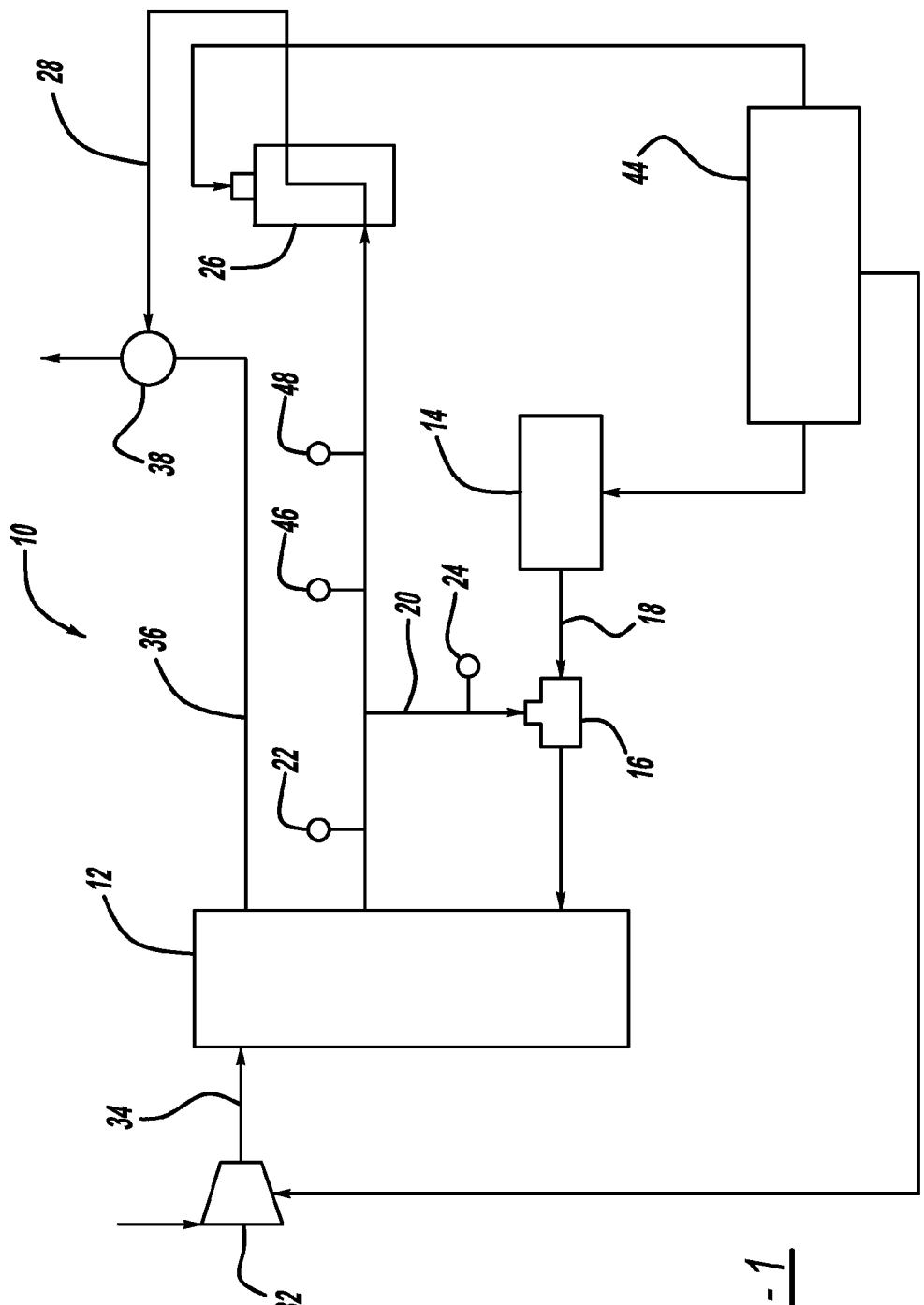
FIG. 1 is a simplified block diagram of a fuel cell system.

FIG. 1 is a simplified block diagram of a fuel cell system 10 including a fuel cell stack 12. Hydrogen gas from a hydrogen source 14 is provided to the anode side of the fuel cell stack 12 on an anode input line 18 utilizing an injector 16, such as an injector/ejector, as described in U.S. Pat. No. 7,320,840 entitled, "Combination of Injector-Ejector for Fuel Cell Systems," issued Jan. 22, 2008, assigned to the assignee of this application and incorporated herein by reference. An anode effluent gas provided at an output of the anode side of the stack 12 is routed back into the fuel cell stack 12 on an anode recirculation line 20. The anode input line 18, the injector 16, the anode side of the stack 12 and the anode recirculation line 20 are all components that make up an "anode sub-system." Nitrogen cross-over from the cathode side of the fuel cell stack 10 dilutes the hydrogen in the anode side of the stack 12, thereby affecting fuel cell stack performance. Therefore, it is necessary to periodically bleed the anode effluent gas from the anode sub-system using a bleed valve 26 to reduce the amount of nitrogen in the anode sub-system, i.e., in the anode side of the fuel cell stack 12. When the bleed valve 26 is open, the bled anode exhaust gas flows through a bleed line 28.

The anode recirculation line 20 includes a first acoustic sensor 22 and a second acoustic sensor 24, spaced apart by a known distance, that receive acoustic signals from operation of the injector 16, which can be used to determine the concentration of hydrogen in the anode effluent gas, as will be discussed in detail below. Examples of acoustic sensors suitable for this purpose include piezoelectric elements that decipher audible noise and produce a voltage output. A temperature sensor 46 and a pressure sensor 48 for measuring the temperature and pressure, respectively, of the anode gas in the recirculation line 20 are also provided.

Air from a compressor 32 is provided to the cathode side of the fuel cell stack 12 on line 34. A cathode exhaust gas is output from the fuel cell stack 12 on a cathode exhaust gas line 36. A mixing device 38 is provided in the line 36 for mixing the cathode exhaust gas from the stack 12 and the bled anode exhaust gas from the line 28.

A controller 44 monitors the temperature and pressure of the anode sub-system of the fuel cell system 10, controls the speed of the compressor 32, controls the injection of hydrogen from the injector 16 to the anode side of the stack 12, and controls the position of the anode bleed valve 26, as is discussed in more detail below.

Figure 2:
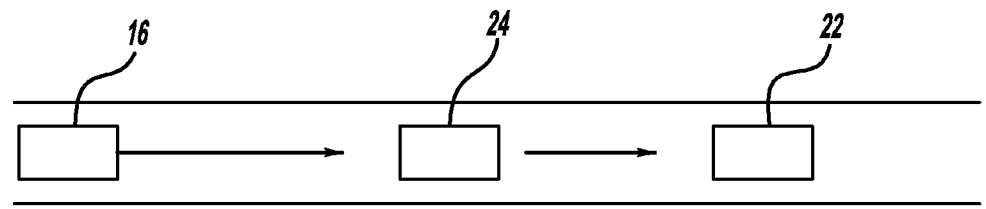
FIG. 2 is a block diagram of an injector and two acoustic sensors in an anode sub-system.

The speed of sound in a gas is related to the temperature and the average atomic mass of the gas. When the speed of sound is known, the distance between two points can be determined by timing. This is the principle that commercial range finders use for measuring short distances. As shown in FIG. 2, knowledge of the distance between two acoustic sensors, such the acoustic sensors 22 and 24, and the time delay between the acoustic detection of sound emitted from the injector 16 by each sensor 22 and 24 can be used to determine the speed of sound of the gas between the sensors 22 and 24. The sound emitted from the injector comes from sonic shock waves of flow of hydrogen through a sonic nozzle of the injector 16 and from the sound of a spindle in the injector 16 hitting a seat upon injection of hydrogen. In an alternate embodiment, more than two acoustic sensors may be utilized, with each acoustic sensor being a known distance from at least one other acoustic sensor.

By utilizing the known distance between the acoustic sensors 22 and 24, and the known time delay between acoustic detection of the sound emitted from the injector 16 by each of the sensors 22 and 24, in combination with the temperature and the speed of sound in the gas, the average molar mass of the gas may be predicted utilizing the following equation:

$$C_{ideal} = \sqrt{\gamma \cdot \frac{p}{\rho}} = \sqrt{\frac{\gamma \cdot R \cdot T}{M}} \quad (1)$$

Where $C_{ideal}$ is the speed of sound in an ideal gas (m/s), R is the molar gas constant (approximately 8.3145 J·mol$^{-1}$·K$^{-1}$), $\gamma$ (gamma) is the adiabatic index, which may be assumed to be 7/5 or 1.400 for diatomic molecules from kinetic theory, T is the absolute temperature in Kelvin and M is the molar mass in kilograms per molecule. The mean molar mass for dry air is about 0.0289 kg/mol.

The measured molar mass ($M_{measured}$), shown as M in equation (1), is a product of the molar fraction and the molar mass of $H_2$, $N_2$ and $H_2O$ found in the anode sub-system, and thus, the calculation of the hydrogen molar fraction ($x_{H2}$) in the effluent gas of the anode sub-system can be summarized by:

$$M_{measured} = x_{H_2} \cdot M_{H_2} + y_{N_2} \cdot M_{N_2} + z_{H_2O} \cdot M_{H_2O} \quad (2)$$

Where $x_{H_2}$ is the molar fraction of hydrogen, $M_{H_2}$ is the molar mass of hydrogen, $y_{N_2}$ is the molar fraction of nitrogen, $M_{N_2}$ is the molar mass of nitrogen, $z_{H_2O}$ is the molar fraction of water and $M_{H_2O}$ is the molar mass of water.

By definition, the sum of the molar fractions of hydrogen, nitrogen and water, discussed above, must add to 1, thus:

$$1 = x_{H_2} + y_{N_2} + z_{H_2O} \quad (3)$$

or $$y_{N_2} = 1 - x_{H_2} - z_{H_2O} \quad (4)$$

Based on knowledge of the operating temperature, reactant stoichiometry and accumulation of water in components of the fuel cell system 10, the relative humidity of the measured gas stream can be estimated. To solve for $z_{H_2O}$, a modeled or measured RH value $RH_{\%\ MODEL}$ from the controller 40 may be converted to a molar fraction using the following equation:

$$z_{H_2O} = \frac{RH_{\% \, MODEL} \cdot P_{sat,H_2O}}{P_{gas}} \quad (5)$$

Where $P_{sat,H_2O}$ is the partial pressure of water and $P_{gas}$ is the partial pressure of the anode effluent gas. Using equations (2), (4) and (5), equation (2) may be rewritten to solve for $x_{H_2}$ using:

$$x_{H_2} = \frac{M_{measured} - M_{N_2} + (M_{H_2O} - M_{N_2}) \cdot \left(\frac{RH_{(\% \, MODEL)} \cdot P_{sat,H_2O}}{P_{gas}}\right)}{(M_{H_2} - M_{N_2})} \quad (6)$$

Figure 3:
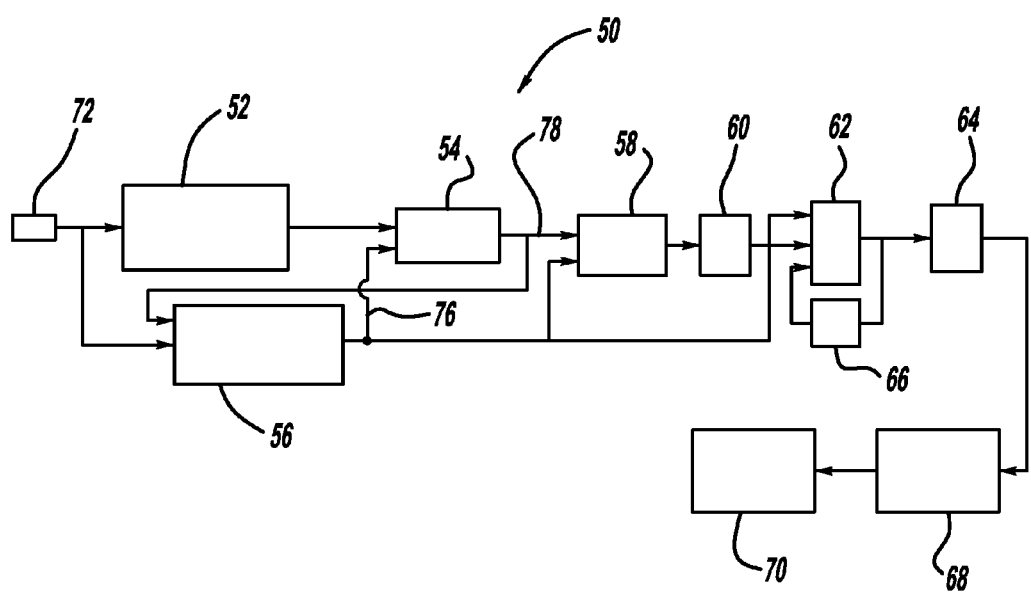
FIG. 3 is a flow chart diagram of an algorithm for determining the concentration of gases in an anode sub-system.

FIG. 3 is a flow diagram 50 of a method for determining the composition of the anode effluent gas in the anode recirculation line 28 utilizing the acoustic sensors 22 and 24 and the audible noise produced by the injector 16, as discussed above. At box 52, the algorithm uses an injector on signal from box 72 to start monitoring the sensor closest in proximity to the injector 16, which is the acoustic sensor 24 in FIG. 1. The algorithm will set a Determine Start Time to true once a response is observed from the acoustic sensor 24 at the box 52. At box 54, a Latch On holds the true condition until a reset condition is set at an input from box 56 to the box 54 on line 76. The reset comes from a Determine Stop Time at the box 56, discussed in detail below. The Latch On at the box 54 outputs a true on line 78 that is used as an input to a counter at box 58, also discussed in more detail below.

At the box 58, the counter increments its output value by one time step as long as the Determine Start Time block at the box 52 remains true. At box 60, a $$\frac{1}{z}$$

output is the input delayed by one loop of time. At this point, the counter is incrementing, and while this is happening the output of the Latch On at the box 54 is used to enable the Determine Stop Time at the box 56 to start checking the sensor farthest in proximity to the injector 16, which is the acoustic sensor 22 in FIG. 1, for a response, i.e., checking for the sensor 22 to detect the audible noise from the injector 16.

If a response is observed at the sensor 22, the output of the Determine Stop Time at the box 56 is set to true at box 62. By setting the Determine Stop Time to true the algorithm will reset the Latch On output at the box 54 to zero, the counter is reset to zero and the previous value of the counter is sent as the time delay between the acoustic sensor 24 and the acoustic sensor 22 at box 64. When the Determine Stop Time is false, the algorithm holds the time output constant to a previous value at box 66.

Figure 4:
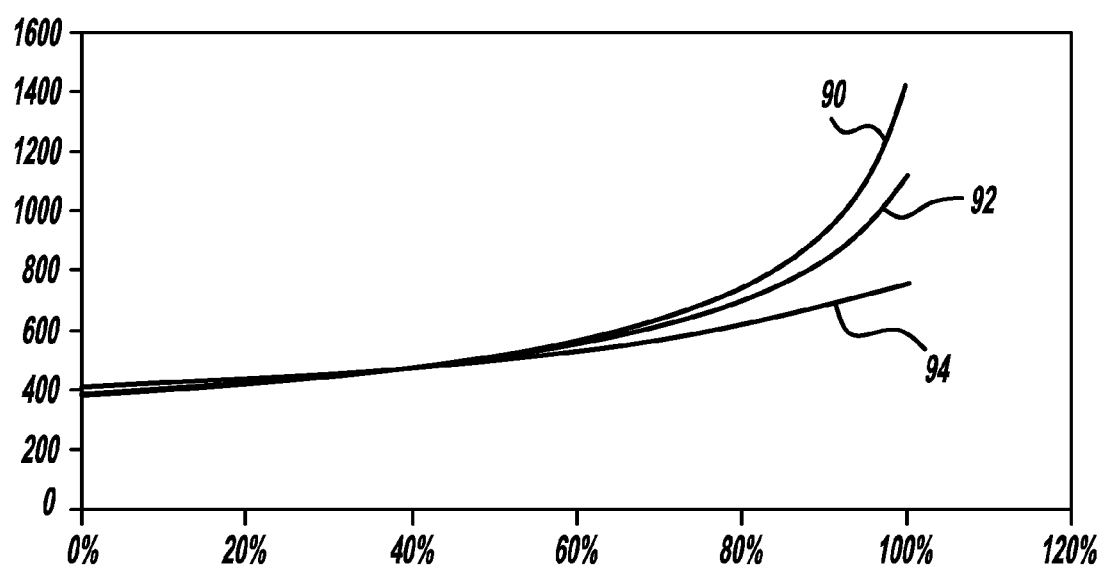
FIG. 4 is a graph with percentage of hydrogen on the x-axis and speed of sound in m/s on the y-axis, illustrating the speed of sound in an anode sub-system at varying levels of relative humidity.

Once a new time is determined at the box 64, the algorithm will use this value as the speed of sound in the anode effluent gas at box 68. The speed of sound is then used to determine the composition of the anode effluent gas at box 70 using the relationship shown in equation (1), where fluid temperature, an estimate of relative humidity and pressure are known. The effect of relative humidity on the speed of sound must be considered because it will effect the molar mass estimate, as shown in FIG. 4 and discussed in more detail below. Using equation (6), the algorithm calculates the molar fraction of hydrogen in the anode effluent gas between sensors 24 and 22 at the box 70. It is expected that as the molar fraction of hydrogen decreases, the speed of sound in the anode effluent gas will also decrease, as the speed of sound of nitrogen is approximately 300 meters per second whereas the speed of sound of hydrogen is approximately 1400 meters per second.

If the calculated molar fraction of hydrogen drops below a threshold value at the box 70, the algorithm will bleed the anode sub-system and/or adjust the anode bleed schedule to ensure the power output of the fuel cell system is not adversely affected by a lack of hydrogen fuel.

FIG. 4 is a graph with percent hydrogen on the x-axis, where the balance of anode gas is nitrogen, and speed of sound in meters per second on the y-axis. Line 90 represents the speed of sound of an anode gas with 0% relative humidity, line 92 represents the speed of sound of an anode gas with 25% relative humidity and line 94 represents the speed of sound of an anode gas with 100% relative humidity. FIG. 4 illustrates that at 150 kPa and 80° C., the speed of sound of an anode gas comprised of a mixture of hydrogen and nitrogen increases as the percentage of relative humidity, i.e., water, in the gas increases. Thus, the concentration of hydrogen in the anode effluent gas may be determined based on the speed of sound of an anode gas as described above, taking into consideration the amount of water present in the anode effluent gas.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
at least one fuel cell including an anode inlet and an anode outlet, said anode inlet and said anode outlet being connected by an anode recirculation line;
a source of hydrogen gas providing hydrogen gas to the anode inlet;
an injection device for injecting the hydrogen gas from the source to the anode inlet, said injection device producing an audible injection noise when it injects the hydrogen gas;
first and second acoustic sensors located in the anode recirculation line and spaced a known distance from each other, said first and second sensors detecting the injection noise and providing a sensor signal indicative of the noise; and
a controller programmed to be responsive to the sensor signals from the first and second acoustic sensors, said controller being programmed to determine the concentration of hydrogen gas in the anode recirculation line based on the time between when the controller receives the sensor signal from the first sensor and receives the sensor signal from the second sensor.

2. The system according to claim 1 wherein the first acoustic sensor is closer to the injection device than the second acoustic sensor.

3. The system according to claim 1 wherein the second acoustic sensor is closer to the at least one fuel cell than the first acoustic sensor.

4. The system according to claim 1 wherein the controller determines the concentration of hydrogen gas in the anode recirculation line based on the time when the controller receives the sensor signal from the first sensor and receives the sensor signal from the second sensor using the speed of sound in an anode effluent gas according to:

$$C_{ideal} = \sqrt{\gamma \cdot \frac{p}{\rho}} = \sqrt{\frac{\gamma \cdot R \cdot T}{M}}$$

where $C_{ideal}$ is the speed of sound in an ideal gas (m/s), R is the molar gas constant (approximately 8.3145 J·mol$^{-1}$·K$^{-1}$), γ (gamma) is the adiabatic index, which may be assumed to be 7/5 or 1.400 for diatomic molecules from kinetic theory, T is the absolute temperature in Kelvin and M is the molar mass in kilograms per molecule, where the mean molar mass for dry air is about 0.0289 kg/mol.

5. The system according to claim 4 wherein the controller determines the concentration of hydrogen gas in the anode recirculation line using the molar mass of the anode effluent gas according to:

$$M_{measured} = x_{H_2} \cdot M_{H_2} + y_{N_2} \cdot M_{N_2} + z_{H_2O} \cdot M_{H_2O}$$

where the measured molar mass of the anode effluent gas $M_{measured}$ is the product of the molar fraction and molar mass of hydrogen, nitrogen and water found in the anode subsystem, where $x_{H_2}$ is the molar fraction of hydrogen, $M_{H_2}$ is the molar mass of hydrogen, $y_{N_2}$ is the molar fraction of nitrogen, $M_{N_2}$ is the molar mass of nitrogen, $z_{H_2O}$ is the molar fraction of water and $M_{H_2O}$ is the molar mass of water.

6. The system according to claim 5 wherein the controller determines the concentration of hydrogen gas in the anode recirculation line using a modeled or measured relative humidity $RH_{\%\ MODEL}$ to determine $z_{H_2O}$ as:

$$z_{H_2O} = \frac{RH_{\%\ MODEL} \cdot P_{sat,H_2O}}{P_{gas}}$$

where $P_{sat,H_2O}$ is the partial pressure of water and $P_{gas}$ is the partial pressure of the anode effluent gas.

7. The system according to claim 6 wherein the controller determines the concentration of hydrogen gas in the anode recirculation line according to:

$$x_{H_2} = \frac{M_{measured} - M_{N_2} + (M_{H_2O} - M_{N_2}) \cdot \left(\frac{RH_{(\%\ MODEL)} \cdot P_{sat,H_2O}}{P_{gas}}\right)}{(M_{H_2} - M_{N_2})}.$$

8. A fuel cell system comprising:
at least one fuel cell including an anode inlet and an anode outlet, said anode inlet and said anode outlet being connected by an anode recirculation line;
a source of hydrogen gas for providing hydrogen gas to the anode inlet;
an injection device for injecting the hydrogen gas from the source to the anode inlet, said injection device producing an audible injection noise when it injects the hydrogen gas;
first and second acoustic sensors located in the anode recirculation line and spaced a known distance from each other, said first and second sensors detecting the injection noise and providing a sensor signal indicative of the noise said first acoustic sensor being closer to the injection device than the second acoustic sensor and said second acoustic sensor being closer to the at least one fuel cell than the first acoustic sensor; and
a controller programmed to be responsive to the sensor signals from the first and second acoustic sensors, said controller being programmed to determine the time between when the controller receives the sensor signal from the first sensor and receives the sensor signal from the second sensor to determine the concentration of a gas in the anode recirculation line.

9. The system according to claim 8 wherein the injection device is an injector/ejector device.

10. The system according to claim 8 wherein the controller determines the concentration of hydrogen gas in the anode recirculation line based on the time when the controller receives the sensor signal from the first sensor and receives the sensor signal from the second sensor using the speed of sound in an anode effluent gas according to:

$$C_{ideal} = \sqrt{\gamma \cdot \frac{p}{\rho}} = \sqrt{\frac{\gamma \cdot R \cdot T}{M}}$$

where $C_{ideal}$ is the speed of sound in an ideal gas (m/s), R is the molar gas constant (approximately 8.3145 J·mol$^{-1}$·K$^{-1}$), γ (gamma) is the adiabatic index, which may be assumed to be 7/5 or 1.400 for diatomic molecules from kinetic theory, T is the absolute temperature in Kelvin and M is the molar mass in kilograms per molecule, where the mean molar mass for dry air is about 0.0289 kg/mol.

11. The system according to claim 10 wherein the controller determines the concentration of hydrogen gas in the anode recirculation line using the molar mass of the anode effluent gas according to:

$$M_{measured} = x_{H_2} \cdot M_{H_2} + y_{N_2} \cdot M_{N_2} + z_{H_2O} \cdot M_{H_2O}$$

where the measured molar mass of the anode effluent gas $M_{measured}$ is the product of the molar fraction and molar mass of hydrogen, nitrogen and water found in the anode subsystem, where $x_{H_2}$ is the molar fraction of hydrogen, $M_{H_2}$ is the molar mass of hydrogen, $y_{N_2}$ is the molar fraction of nitrogen, $M_{N_2}$ is the molar mass of nitrogen, $z_{H_2O}$ is the molar fraction of water and $M_{H_2O}$ is the molar mass of water.

12. The system according to claim 11 wherein the controller determines the concentration of hydrogen gas in the anode recirculation line using a modeled or measured relative humidity $RH_{\%\ MODEL}$ to determine $z_{H_2O}$ as:

$$z_{H_2O} = \frac{RH_{\%\ MODEL} \cdot P_{sat,H_2O}}{P_{gas}}$$

where $P_{sat,H_2O}$ is the partial pressure of water and $P_{gas}$ is the partial pressure of the anode effluent gas.

13. The system according to claim 12 wherein the controller determines the concentration of hydrogen gas in the anode recirculation line according to:

$$x_{H_2} = \frac{M_{measured} - M_{N_2} + (M_{H_2O} - M_{N_2}) \cdot \left(\frac{RH_{(\%\ MODEL)} \cdot P_{sat,H_2O}}{P_{gas}}\right)}{(M_{H_2} - M_{N_2})}.$$

14. A method for determining the concentration of hydrogen gas in an anode recirculation line of a fuel cell system, said fuel cell system including at least one fuel cell having an anode inlet and an anode outlet connected by the anode recirculation line, said method comprising:

providing fresh hydrogen gas to the anode inlet using an injection device;

detecting an injection noise from the injection device at a first location in the anode recirculation line;

detecting the injection noise from the injection device at a second location in the anode recirculation line that is a known distance from the first location; and determining the concentration of hydrogen gas in the anode recirculation line based on the detection time between when the injection noise is detected at the first location and the second location.

15. The method according to claim 14 wherein determining the concentration of hydrogen gas in the anode recirculation line includes using the speed of sound of an anode effluent gas according to:

$$C_{ideal} = \sqrt{\gamma \cdot \frac{p}{\rho}} = \sqrt{\frac{\gamma \cdot R \cdot T}{M}}$$

where $C_{ideal}$ is the speed of sound in an ideal gas (m/s), R is the molar gas constant (approximately 8.3145 J·mol$^{-1}$·K$^{-1}$), γ (gamma) is the adiabatic index, which may be assumed to be 7/5 or 1.400 for diatomic molecules from kinetic theory, T is the absolute temperature in Kelvin and M is the molar mass in kilograms per molecule, where the mean molar mass for dry air is about 0.0289 kg/mol.

16. The method according to claim 15 wherein determining the concentration of hydrogen gas in the anode recirculation line includes using the molar mass of the anode effluent gas according to:

$$M_{measured} = x_{H_2} \cdot M_{H_2} + y_{N_2} \cdot M_{N_2} + z_{H_2O} \cdot M_{H_2O}$$

where the measured molar mass of the anode effluent gas $M_{measured}$ is the product of the molar fraction and molar mass of hydrogen, nitrogen and water found in the anode subsystem, where $x_{H_2}$ is the molar fraction of hydrogen, $M_{H_2}$ is the molar mass of hydrogen, $y_{N_2}$ is the molar fraction of nitrogen, $M_{N_2}$ is the molar mass of nitrogen, $z_{H_2O}$ is the molar fraction of water and $M_{H_2O}$ is the molar mass of water.

17. The method according to claim 16 wherein determining the concentration of hydrogen gas in the anode recirculation line recirculation line using a modeled or measured relative humidity $RH_{\%\ MODEL}$ to determine $z_{H_2O}$ as:

$$z_{H_2O} = \frac{RH_{\%\ MODEL} \cdot P_{sat,H_2O}}{P_{gas}}$$

where $P_{sat,H_2O}$ is the partial pressure of water and $P_{gas}$ is the partial pressure of the anode effluent gas.

18. The method according to claim 17 wherein determining the concentration of hydrogen gas in the anode recirculation line includes determining the molar fraction of hydrogen as:

$$x_{H_2} = \frac{M_{measured} - M_{N_2} + (M_{H_2O} - M_{N_2}) \cdot \left(\frac{RH_{(\%\ MODEL)} \cdot P_{sat,H_2O}}{P_{gas}}\right)}{(M_{H_2} - M_{N_2})}.$$

19. The method according to claim 14 wherein providing fresh hydrogen gas to the anode inlet using an injection device includes using an injector/ejector.

20. The method according to claim 14 wherein the first location is closer to the injection device than the second location and the second location is closer to the at least one fuel cell than the first location.

* * * * *